United States Patent
Lucy et al.

(10) Patent No.: US 10,417,845 B1
(45) Date of Patent: Sep. 17, 2019

(54) DETECTING UNAUTHORIZED PHYSICAL ACCESS VIA WIRELESS ELECTRONIC DEVICE IDENTIFIERS

(71) Applicant: International Business Machines Corporation, Armonk, NY (US)

(72) Inventors: William Lucy, Durham, NC (US); Hank Ibell, Morrisville, NC (US); John Anthony Feller, Cary, NC (US); Christopher Meyer, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/904,801

(22) Filed: Feb. 26, 2018

(51) Int. Cl.
| | |
|---|---|
| *G07C 9/00* | (2006.01) |
| *H04W 4/38* | (2018.01) |
| *H04W 4/80* | (2018.01) |
| *G08B 13/00* | (2006.01) |
| *G08B 13/22* | (2006.01) |

(52) U.S. Cl.
CPC ......... *G07C 9/00007* (2013.01); *G08B 13/22* (2013.01); *H04W 4/38* (2018.02); *H04W 4/80* (2018.02)

(58) Field of Classification Search
None
See application file for complete search history.

(56) References Cited

U.S. PATENT DOCUMENTS

| | | | |
|---|---|---|---|
| 6,448,906 B1 | 9/2002 | Nachtsheim et al. | |
| 6,765,492 B2 * | 7/2004 | Harris | B67D 7/3236 |
| | | | 141/192 |
| 7,346,338 B1 | 3/2008 | Calhoun et al. | |
| 8,310,379 B2 * | 11/2012 | Johnson | G06Q 10/08 |
| | | | 340/10.1 |
| 8,793,790 B2 * | 7/2014 | Khurana | G06F 21/552 |
| | | | 726/1 |
| 9,300,925 B1 * | 3/2016 | Zhang | H04N 7/181 |

(Continued)

OTHER PUBLICATIONS

Anonymously; "System and Method for Physical Access Verification Using Augmented Reality Device"; http//ip.com/IPCOM/000246907D; Jul. 13, 2016, pp. 1-5.

(Continued)

*Primary Examiner* — Carlos Garcia
(74) *Attorney, Agent, or Firm* — Scully, Scott, Murphy & Presser, PC; Michael P. O'Keefe, Esq.

(57) ABSTRACT

Monitoring a physical area for unauthorized access by a user of a wireless device includes setting a wireless signal scanning range using at least one wireless scanning device, detecting a wireless signal within the scanning range, determining a status of the wireless device of authorized, unauthorized or unknown, monitoring scan data obtained from the scanning device during the time the wireless signal remains within the scanning range. A scan data pattern based on the monitored scan data is determined and compared to a scan data pattern database containing scan data patterns indicative of suspicious behavior and determining whether the monitored scan data pattern matches a suspicious scan data pattern based on the comparison. The system identifies the wireless device as unauthorized in response to a match with a suspicious scan data pattern and activates a security alert.

18 Claims, 6 Drawing Sheets

(56) References Cited

U.S. PATENT DOCUMENTS

| | | | |
|---|---|---|---|
| 2010/0295656 A1* | 11/2010 | Herickhoff | H04L 63/08 340/3.1 |
| 2013/0005381 A1* | 1/2013 | Turkka | H04W 36/0085 455/517 |
| 2014/0277654 A1* | 9/2014 | Reinhardt | G06F 3/165 700/94 |
| 2014/0317744 A1 | 10/2014 | Turgeman et al. | |
| 2014/0337503 A1 | 11/2014 | Hefetz | |
| 2015/0061825 A1* | 3/2015 | Suzuki | H04W 4/21 340/5.52 |
| 2016/0127931 A1* | 5/2016 | Baxley | G01S 5/0263 455/67.16 |
| 2018/0014150 A1* | 1/2018 | Elias | H04L 63/0861 |
| 2018/0040217 A1* | 2/2018 | Feldman | G08B 13/00 |
| 2018/0167774 A1* | 6/2018 | Hodge | H04W 4/023 |
| 2018/0184286 A1* | 6/2018 | Patterson | H04W 12/02 |

OTHER PUBLICATIONS

IBM; "Wearable Device to Detect Potential Interference or Unauthorized Access Attempts to Implanted Medical Devices"; http://ip.com/IPCOM/000178330D; Jan. 22, 2009, pp. 1-3.

\* cited by examiner

US 10,417,845 B1

DETECTING UNAUTHORIZED PHYSICAL ACCESS VIA WIRELESS ELECTRONIC DEVICE IDENTIFIERS

BACKGROUND OF THE INVENTION

This disclosure is directed to computers, and computer applications, and more particularly to computer-implemented methods and systems for monitoring a physical area for unauthorized access by a user of a wireless device.

Detecting unauthorized physical access to an area can be a difficult task. Currently available methods include motion/video and audio detecting systems. These systems also may include physical access detection such as door open alarms. These systems, however, can be difficult and expensive to install and maintain.

In addition, current geo-fencing solutions focus on authorized known devices and would result in many false positives if used for unauthorized device detection.

SUMMARY OF THE INVENTION

One embodiment of a computer implemented method for monitoring a physical area for unauthorized access by a user of a wireless device includes the steps of storing in a database an authorized wireless device ID list and an unauthorized wireless device ID list and setting a wireless signal scanning range using at least one wireless scanning device, the scanning range corresponding to the physical area being monitored.

In one embodiment, the computer implemented method further includes scanning for signals from a wireless device within the scanning range using the wireless scanning device; detecting an in-range wireless signal from a wireless device within the scanning range; determining a wireless device ID associated with the an in-range wireless signal; comparing the wireless device ID associated with the in-range wireless signal with the wireless ID lists stored on the database; and determining a status of the wireless device ID associated with the in-range wireless signal based on the comparison, the status being one of authorized, unauthorized and unknown.

In one embodiment, the computer implemented method further includes analyzing the in-range wireless signal to determine scan data representative the in-range wireless signal in response to the status of the wireless device ID associated with the in-range wireless signal being unknown; and monitoring the scan data during the time duration in which the in-range wireless signal remains within the scanning range;

In one embodiment, the computer implemented method further includes determining a scan data pattern based on the monitored scan data; comparing the monitored scan data pattern to a scan data pattern database, the scan data pattern database containing scan data patterns indicative of suspicious behavior of a user of the wireless device; and determining whether the monitored scan data pattern matches a suspicious scan data pattern based on the comparison.

In one embodiment, the computer implemented method further includes identifying the wireless device ID associated with the in-range wireless signal as unauthorized in response to a match with a suspicious scan data pattern; and activating a security alert in response to the wireless device ID associated with the in-range wireless signal being identified as unauthorized.

In one embodiment a computer implemented method for monitoring a physical area for unauthorized access by a user of a wireless device, comprises storing in a database an authorized wireless device ID list and an unauthorized wireless device ID list, scanning, by a wireless signal detection device coupled to a computer, for signals from a wireless device, detecting, by the wireless signal detection device, a wireless signal from a wireless device and determining, by the computer, a wireless device ID associated with the wireless signal. In response to determining, by the computer, that the wireless device ID associated with the wireless signal matches a wireless ID in the unauthorized wireless ID list, activate a security alert. In response to determining, by the computer, that the wireless device ID associated with the wireless signal does not match a wireless ID in the authorized wireless ID list nor the unauthorized wireless ID list, receiving, by the computer from the wireless signal detection device, signal strength information associated with the detected wireless signal for a predetermined time interval and in response to determining that a pattern as a function of time of the received signal strength matches, within a threshold value, a signal strength pattern that has been identified as suspicious, activate a security alert.

A system that includes one or more processors operable to perform one or more methods described herein also may be provided.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION OF PREFERRED EMBODIMENTS

The present disclosure is directed to a method and system for monitoring a physical area for unauthorized access. The monitoring and unauthorized access detection method and system utilizes the current tendency of individuals to carry personal electronic devices which often have their wireless function left enabled. The wireless function technologies, which include, for example, Bluetooth, Wi-Fi, and cellular, are all commonly left on, which means the devices are constantly transmitting a signal. In one embodiment, the method and system detects passing devices that enter into a predetermined zone without attempting to connect to an unknown device. Then, once an unknown device is detected, the system will evaluate the signal to obtain information about the device based on the detected signal. With this information, the monitoring and unauthorized access detection method and system can determine what action to take, such as, log the access for further review, create an alert and/or trigger additional security devices.

Figure 1:
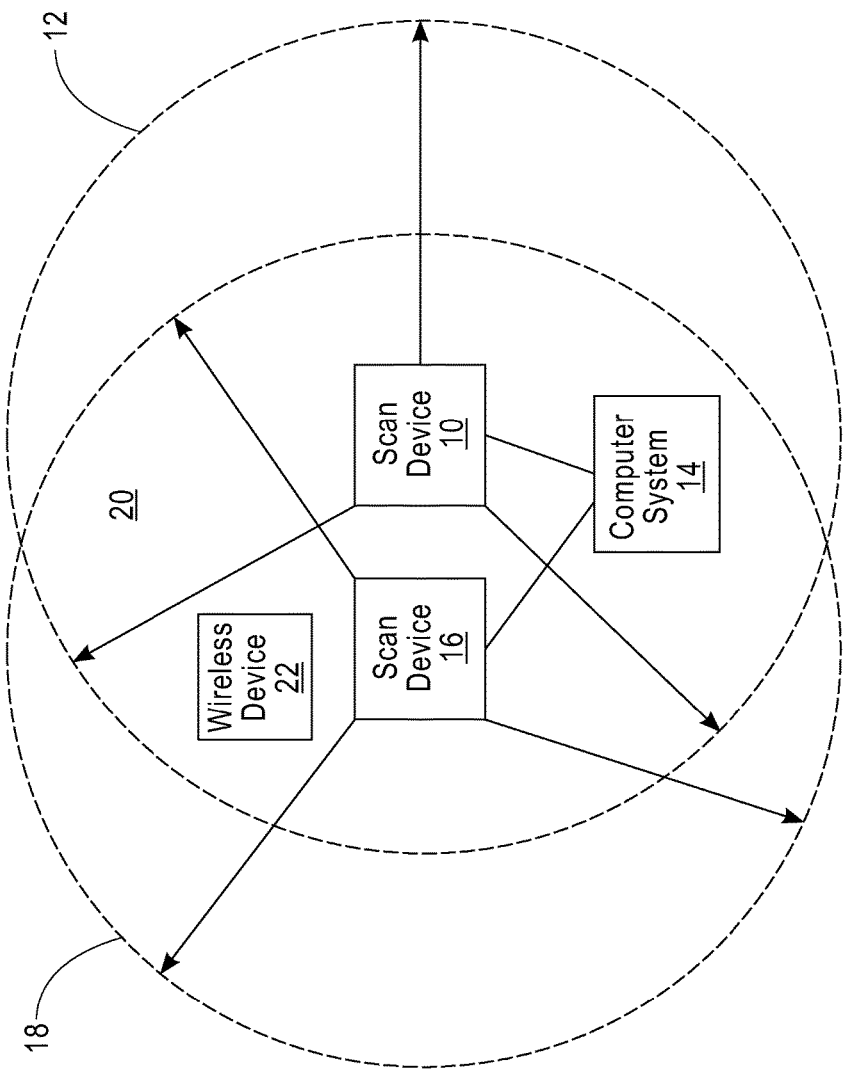
FIG. 1 is a schematic diagram of one embodiment of the system for monitoring and unauthorized access detection disclosed in this specification.
Figure 6:
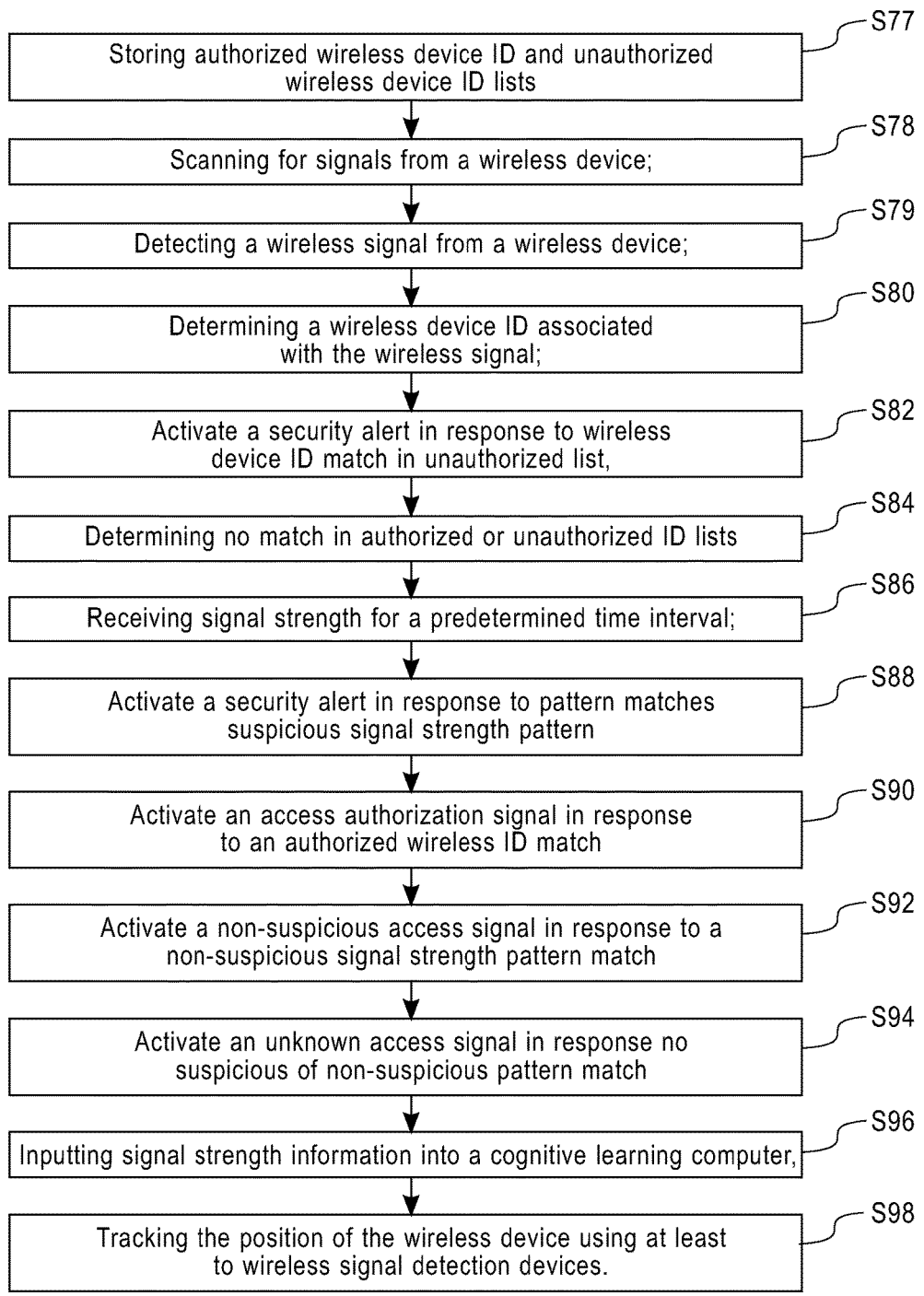
FIG. 6 is a flow diagram of another embodiment of the method disclosed in this specification.

In one embodiment, shown in FIG. 1, a single scanning device 10, similar to a Wi-Fi router or Bluetooth device, is positioned in a central location within the physical area to be monitored. The centralized scanning device 10 will passively scan for wireless devices that come within the scanning range 12 of the central device. When a wireless device 22 comes within range 12, a computer analysis system 14 records the device ID. The computer system 14 includes a database that stores authorized and an unauthorized wireless device ID lists. One example of the computer system 14 is shown in FIG. 6 which will be described later.

Figure 2:
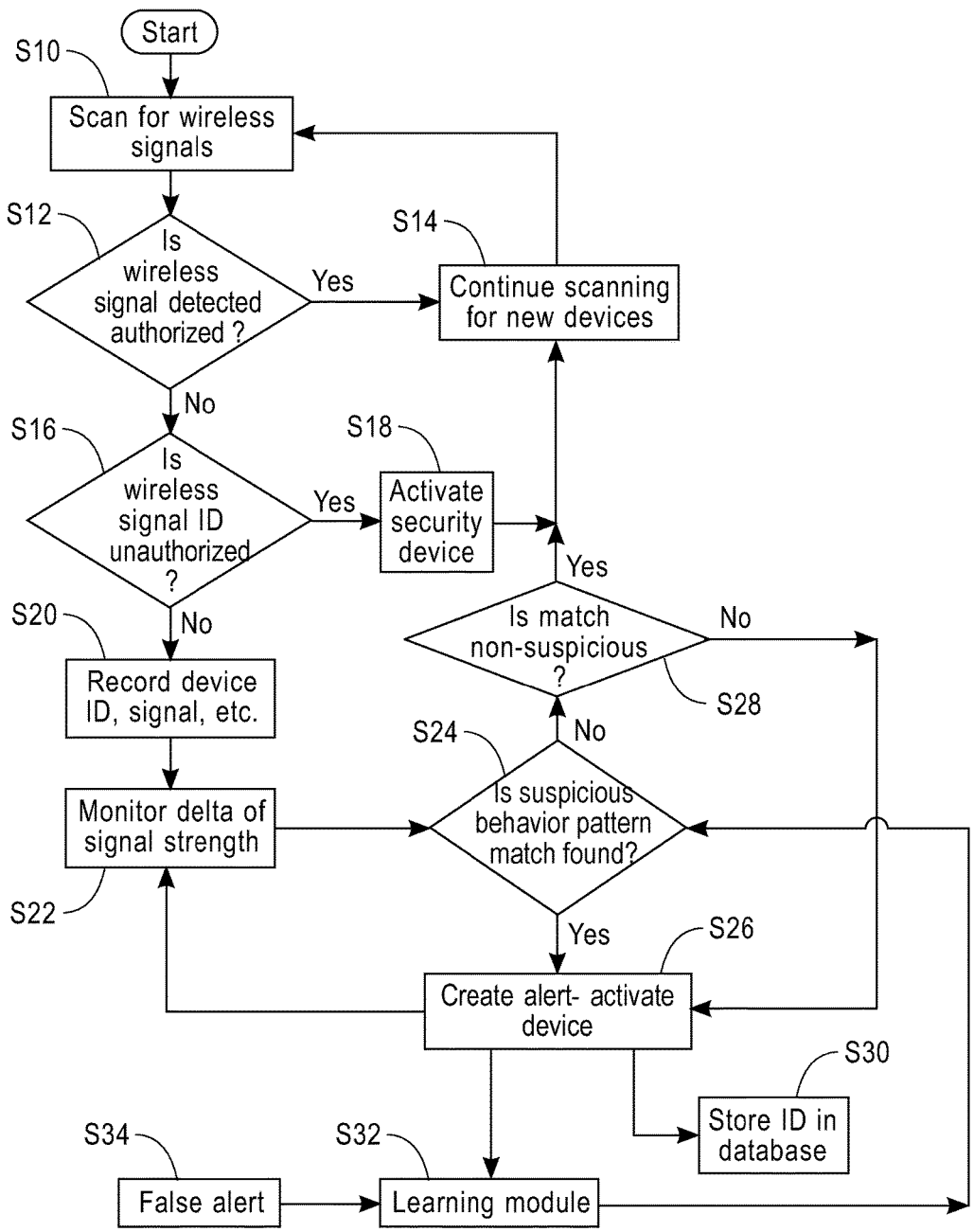
FIG. 2 is a flow diagram of one embodiment of the method disclosed in this specification.

In one embodiment of the computer implemented monitoring and unauthorized access detection method and system, shown in FIG. 2, the scan device 10 scans for a wireless signal in step S10. If a wireless signal is detected, in step S12 the computer system 14 compares the device ID with the database to determine whether or not the wireless signal is from an authorized device. If the signal is from an authorized device, YES at step S12, the computer system 14 at step S14 continues scanning for new devices (step S10). If the signal is not form an authorized device, NO at S12, the computer system 14 determines whether or not the wireless signal is from an unauthorized device at step S16. If the signal is from an unauthorized device, YES at step S16, the computer system 14 activates a security alert at step S18. The computer system 14 at step S14 continues scanning for new devices (step S10).

If the signal is not from an unauthorized device, NO at step S16, the computer system 14 determines the device is unknown and begins obtaining and recording information at step S20 from the signal. The obtained scan data is representative of the in-range wireless signal and may include device ID, device type, signal strength, and other data obtained from the signal by the scanning device 10.

The computer system 14 monitors the scan data at step S22 and records changes in the scan data over the time period the signal is detected to be within the scanning range. In one embodiment, the computer system 14 monitors the signal behavior, such as how long the device is within range and the delta of the signal strength over that time period. The computer system 14 stores patterns of signal behavior that have been identified as suspicious behavior and patterns that have been identified as non-suspicious behavior. The computer system 14 at step S24 performs pattern matching between the behavior pattern determined from the monitored signal and the patterns in the database to determine if a match is found to a suspicious pattern. The match may be based on a similarity within a predefined threshold or as determined by a machine learning model. If a match is found to a suspicious pattern, YES at step S24, an alert is created and/or a security device is activated at step S26. If no match is found to a suspicious pattern, NO at step S24, the method moves to step S28 in which the computer system 14 determines whether there is a match with a non-suspicious pattern. If a match is found to a non-suspicious pattern, YES at step S28, the computer system 14 is reset at step S14 to continue scanning for new devices and the method returns to step S10. If no match is found to a non-suspicious pattern, NO at step S28, because the pattern is unknown and therefore potentially suspicious, an alert is created and optionally a security device can be activated at step S26. The device ID for the wireless device that caused the alert to be activated is stored in the device ID database in step S30. Activating a security device may include activating a mechanism to deny access to a portion of the physical area being monitored or activating a surveillance camera.

In one embodiment, false positive alarms can be flagged by the system operator and sent to a cognitive learning environment, so that future similar Wi-Fi device detections will also be flagged as non-suspicious behavior. As shown in FIG. 2, a notification that an alert and/or a security device activation has taken place is sent in step S32 to a learning module of the computer system 14. The leaning module updates the signal matching performed by computer system 14 to indicate that a previously unknown signal pattern is a suspicious pattern. In one embodiment, the user of the system can receive a notification that an alert and/or a security device activation has taken place. The owner then can access via other means, such as security cameras, information or data that would indicate to the user that the alert was invalid. The user can then flag the alert as invalid in step S34. The invalid flag is transmitted to the learning module to update the pattern matching. The mobile device information and other scan data such as the duration and signal strength are recorded so that similar readings are not flagged as a false positive.

In one embodiment, the invalid flag by the user will be applicable only to previously unknown patterns that are initially identified as suspicious at step S28. In this embodiment, the user may also be able to set a temporary one time invalid flag for an alert that was previously listed as suspicious at step S24. In this embodiment, the user determines via the video camera or other means that the user of the wireless signal device being detected is not a suspicious person, even though the signal behavior matches that of a suspicious person. The learning module does not update the pattern matching when a temporary invalid flag is set by the user.

Current geo-fencing systems are not useful for detecting unauthorized devices because there could be many false positive alarms generated. The monitoring and unauthorized access detection system and method disclosed herein solves this issue by have false and valid alarms captured and sent to a central database so that a learning algorithm can be utilized to eliminate the false positives.

The following is one non-limiting exemplary use of the monitoring and unauthorized access detection system disclose herein by a single-family household for a standalone property. A device to scan for unknown devices using Bluetooth, Wi-Fi, or other wireless signals is placed in the center of the house. The homeowner can calibrate the scanning device to only detect wireless devices within the range of the property. The homeowner additionally configures the scanning device to ignore all known electronic devices, such as laptops, smart devices, cell phones belonging to family.

At a time when the homeowner and all home occupants are away from the house, the scanning device first detects an unknown device, then begins monitoring and recording the scan data, such as the signal strength, time duration and device ID. The system determines that the signal is getting stronger. The signal then decreases rapidly and exits the scanning zone. Given the short duration of the unknown device event, the system does not generate an alarm because it matches a stored pattern flagged as not suspicious. For example, there is no alarm when the pattern matches the pattern of a package delivery. Later on the same day, however, the system detects an unknown signal, the signal gets stronger and stays strong for more than a few moments. The system generates an alert based on this suspicious signal strength behavior matching a suspicious behavior pattern. Later that same day, when the user returns home, they notice that their motorcycle has been stolen out of their driveway. The homeowner can see from the log that a specific unknown device ID generated an alarm on the device. The homeowner can take this device ID information to the police, as additional evidence to be used in any investigation.

Figure 3:
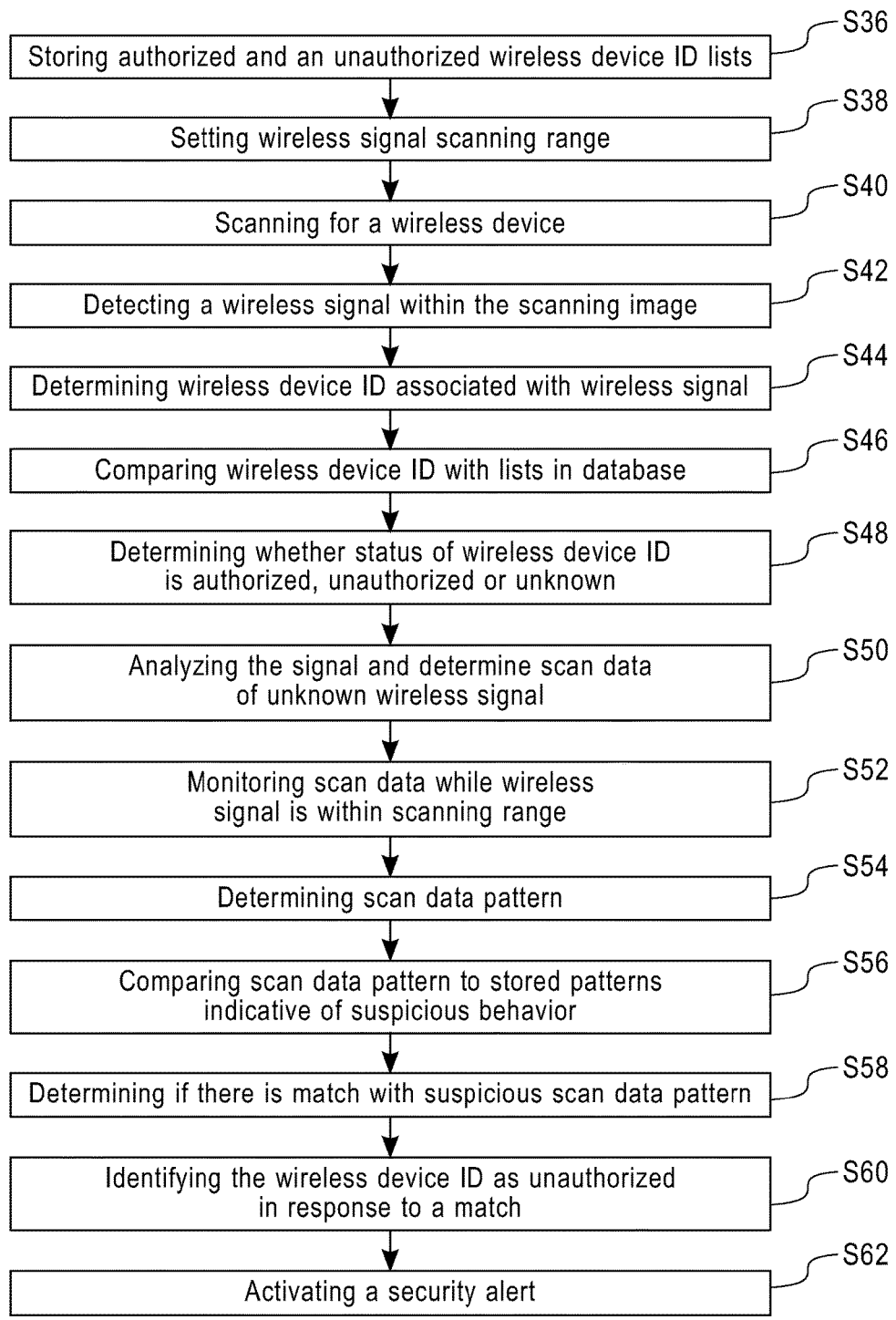
FIG. 3 is a flow diagram of another embodiment of the method disclosed in this specification.

Another embodiment of a computer implemented method for monitoring a physical area for unauthorized access by a user of a wireless device is shown in FIG. 3. In the method of FIG. 3, the computer system 14 performs step S36 of storing in a database an authorized wireless device ID list and an unauthorized wireless device ID list. In step S38 a wireless signal scanning range using at least one wireless scanning device 10 is set, the scanning range corresponding to the physical area being monitored. The method then includes step S40 of scanning for signals from a wireless device 22 within the scanning range using the scanning device 10, step S42 of detecting an in-range wireless signal from a wireless device 22 within the scanning range. The computer system 14 at step S44 performs determining a wireless device ID associated with the an in-range wireless signal. The computer system 14 next performs step S46 of comparing the wireless device ID associated with the in-range wireless signal with the wireless ID lists stored on the database and step S48 of determining a status of the wireless device ID associated with the in-range wireless signal based on the comparison, the status being one of authorized, unauthorized and unknown. The computer system 14 further performs step S50 of analyzing the in-range wireless signal to determine scan data representative the in-range wireless signal in response to the status of the wireless device ID associated with the in-range wireless signal being unknown.

The method as performed by the computer system 14 next includes step S52 of monitoring the scan data during the time duration in which the in-range wireless signal remains within the scanning range and step S54 of determining a scan data pattern based on the monitored scan data. The method further includes step S56 of comparing the monitored scan data pattern to a scan data pattern database, the scan data pattern database containing scan data patterns indicative of suspicious behavior of a user of the wireless device. The method also includes step S58 of determining whether the monitored scan data pattern matches a suspicious scan data pattern based on the comparison, step S60 of identifying the wireless device ID associated with the in-range wireless signal as unauthorized in response to a match with a suspicious scan data pattern and step S62 of activating a security alert in response to the wireless device ID associated with the in-range wireless signal being identified as unauthorized.

Figure 4:
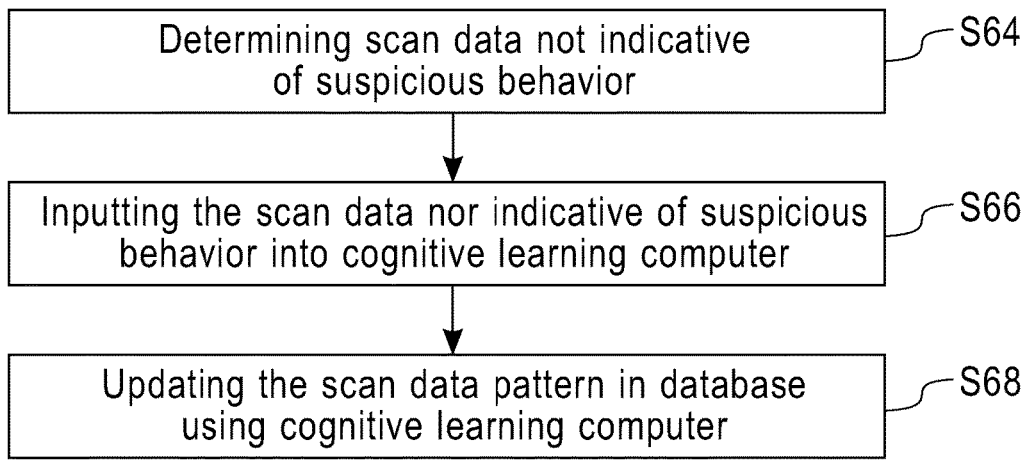
FIG. 4 is a flow diagram of another embodiment of the method disclosed in this specification.

One embodiment of the computer implemented monitoring and unauthorized access detection method, as shown in FIG. 4, includes step S64 determining that the monitored scan data is not indicative of suspicious behavior of the user of the wireless device, step S66 of inputting the scan data of the monitored scan data determined not to be indicative of suspicious behavior into a cognitive learning computer, and step S68 of updating the scan data patterns indicative of suspicious behavior stored in the scan data pattern database based on the inputted scan data, using the cognitive learning computer.

Figure 5:
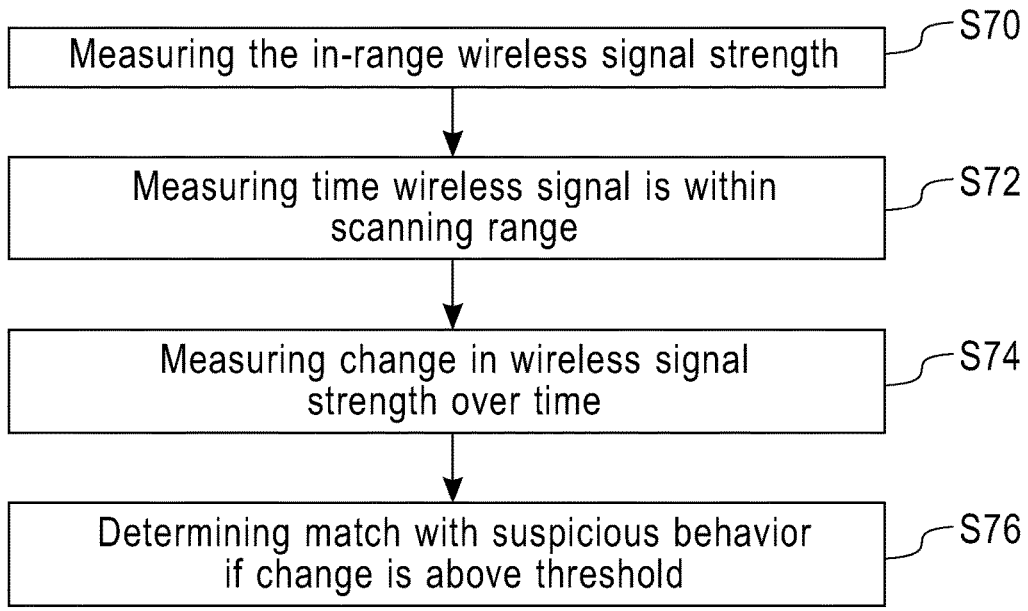
FIG. 5 is a flow diagram of another embodiment of the method disclosed in this specification.

One embodiment of the computer implemented monitoring and unauthorized access detection method, as shown in FIG. 5, includes step S70 of measuring the in-range wireless signal strength, step S72 of measuring the length of time the in-range wireless signal is within the scanning range, step S74 of measuring a change in the in-range wireless signal strength over the length of time the in-range wireless signal is within the scanning range and step S76 of determining a match with a suspicious behavior pattern if the change is above a threshold.

In one embodiment, a plurality of wireless scanning device can be used to set the signal scanning range that corresponds to the physical area being monitored. In the embodiment shown in FIG. 1, a second wireless scanning device 16 is used. The scan device 16 has a scanning range 18. In this embodiment, the scan data can include the location of the wireless device generating the signal being detected by tracking the position of the in-range wireless signal within the overlapped scanning range 20 using the two wireless scanning devices 10 and 16.

FIG. 6 is a flow diagram of another embodiment of a computer implemented method for monitoring a physical area for unauthorized access by a user of a wireless device. The method includes step S77 of storing in a database an authorized wireless device ID list and an unauthorized wireless device ID list, step S78 of scanning, by a wireless signal detection device coupled to a computer, for signals from a wireless device, step S79 of detecting, by the wireless signal detection device, a wireless signal from a wireless device, and step S80 of determining, by the computer, a wireless device ID associated with the wireless signal. In step S82, in response to determining, by the computer, that the wireless device ID associated with the wireless signal matches a wireless ID in the unauthorized wireless ID list, activate a security alert. In step S84, in response to determining, by the computer, that the wireless device ID associated with the wireless signal does not match a wireless ID in the authorized wireless ID list nor the unauthorized wireless ID list, in step S86 receiving, by the computer from the wireless signal detection device, signal strength information associated with the detected wireless signal for a predetermined time interval. In step S88 in response to determining that a pattern as a function of time of the received signal strength matches, within a threshold value, a signal strength pattern that has been identified as suspicious, activate a security alert In step S90 in response to determining, by the computer, that the wireless device ID associated with the wireless signal matches a wireless ID in the authorized wireless ID list, activate an access authorization signal. In step S92, in response to determining that the pattern as a function of time of the received signal strength matches, within a threshold value, a signal strength pattern that has been identified as not suspicious, activate a non-suspicious access signal. In step S94, in response to determining that the pattern as a function of time of the received signal strength does not match, within a threshold value, a signal strength pattern that has been identified as suspicious nor a signal strength pattern that has been identified as not suspicious, activate an unknown access signal. In step S96, inputting the signal strength information associated with the detected wireless signal for a predetermined time into a cognitive learning computer, the cognitive learning computer updating signal strength patterns indicative of suspicious behavior stored in a scan data pattern database. In step S98, tracking the position of the wireless device using at least to wireless signal detection devices.

Figure 7:
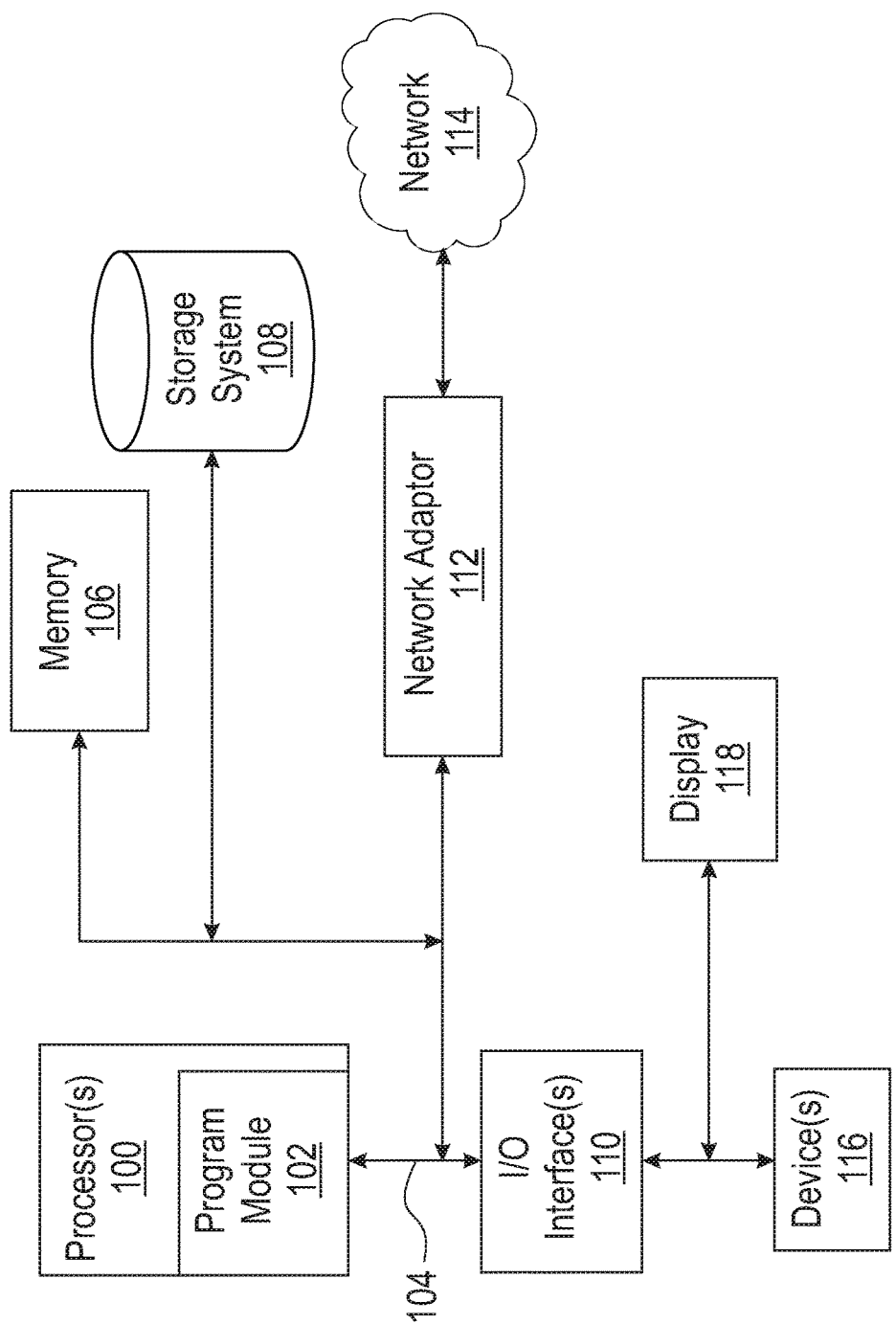
FIG. 7 is a block diagram of an exemplary computing system suitable for implementation of the embodiments disclosed in this specification.

FIG. 7 illustrates a schematic of an example computer or processing system that may implement the method for monitoring a physical area for unauthorized access by a user of a wireless device in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 7 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 100, a system memory 106, and a bus 104 that couples various system components including system memory 106 to processor 100. The processor 100 may include a program module 102 that performs the methods described herein. The module 102 may be programmed into the integrated circuits of the processor 100, or loaded from memory 106, storage device 108, or network 114 or combinations thereof.

Bus 104 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 106 can include computer system readable media in the form of volatile memory, such as random access memory (RAM) and/or cache memory or others. Computer system may further include other removable/non-removable, volatile/non-volatile computer system storage media. By way of example only, storage system 108 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 104 by one or more data media interfaces.

Computer system may also communicate with one or more external devices 116 such as a keyboard, a pointing device, a display 118, etc.; one or more devices that enable a user to interact with computer system; and/or any devices (e.g., network card, modem, etc.) that enable computer system to communicate with one or more other computing devices. Such communication can occur via Input/Output (I/O) interfaces 110.

Still yet, computer system can communicate with one or more networks 114 such as a local area network (LAN), a general wide area network (WAN), and/or a public network (e.g., the Internet) via network adapter 112. As depicted, network adapter 112 communicates with the other components of computer system via bus 104. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a non-transitory computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

In addition, while preferred embodiments of the present invention have been described using specific terms, such description is for illustrative purposes only, and it is to be understood that changes and variations may be made without departing from the spirit or scope of the following claims.

What is claimed is:

1. A computer implemented method for monitoring a physical area for unauthorized access by a user of a wireless device, comprising:
   storing in a database an authorized wireless device ID list and an unauthorized wireless device ID list;
   scanning, by a wireless signal detection device coupled to a computer, for signals from a wireless device within a scanning range defining the physical area;
   detecting, by the wireless signal detection device, a wireless signal from a wireless device within the scanning range;

determining, by the computer, a wireless device ID associated with the wireless device detected within the scanning range;

determining, by the computer, whether the wireless device is authorized, unauthorized or unknown, in response to determining, by the computer, that the wireless device ID associated with the wireless signal matches a wireless ID in the unauthorized wireless ID list, determine, by the computer, that the wireless device is unauthorized and activate a security alert;

in response to determining, by the computer, that the wireless device ID associated with the wireless signal does not match a wireless ID in the authorized wireless ID list or the unauthorized wireless ID list, determine that the wireless device is unknown;

monitoring, by the computer from the wireless signal detection device, signal strength information associated with the detected wireless signal of the unknown wireless device for a predetermined time interval;

comparing a pattern as a function of time of the received signal strength of the unknown wireless device to signal strength patterns stored in a database; and in response to determining that the pattern as a function of time of the received signal strength of the unknown wireless device matches, within a threshold value, a signal strength pattern in the database that has been identified as suspicious, determine, by the computer, that the unknown wireless device is a suspicious wireless device within the physical area and activate a security alert.

2. The computer implemented method of claim 1, further comprising in response to determining, by the computer, that the wireless device ID associated with the wireless signal matches a wireless ID in the authorized wireless ID list, activate an access authorization signal.

3. The computer implemented method of claim 1, further comprising in response to determining that the pattern as a function of time of the received signal strength matches, within a threshold value, a signal strength pattern that has been identified as not suspicious, activate a non-suspicious access signal.

4. The computer implemented method of claim 1, further comprising in response to determining that the pattern as a function of time of the received signal strength does not match, within a threshold value, a signal strength pattern that has been identified as suspicious nor a signal strength pattern that has been identified as not suspicious, activate an unknown access signal.

5. The computer implemented method of claim 1, further comprising inputting the signal strength information associated with the detected wireless signal for a predetermined time into a cognitive learning computer, the cognitive learning computer updating signal strength patterns indicative of suspicious behavior stored in a scan data pattern database.

6. The computer implemented method of claim 1, further comprising tracking the position of the wireless device using at least to wireless signal detection devices.

7. A computer system for monitoring a physical area for unauthorized access by a user of a wireless device, comprising:

one or more computer processors;

one or more non-transitory computer-readable storage media;

program instructions, stored on the one or more non-transitory computer-readable storage media, which when implemented by the one or more processors, cause the computer system to perform the steps of:

storing in a database an authorized wireless device ID list and an unauthorized wireless device ID list;

scanning, by a wireless signal detection device coupled to a computer, for signals from a wireless device within a scanning range defining the physical area;

detecting, by the wireless signal detection device, a wireless signal from a wireless device within the scanning range;

determining, by the computer, a wireless device ID associated with the wireless device detected within the scanning range;

determining, by the computer, whether the wireless device is authorized, unauthorized or unknown, in response to determining, by the computer, that the wireless device ID associated with the wireless signal matches a wireless ID in the unauthorized wireless ID list, determine, by the computer, that the wireless device is unauthorized and activate a security alert;

in response to determining, by the computer, that the wireless device ID associated with the wireless signal does not match a wireless ID in the authorized wireless ID list or the unauthorized wireless ID list, determine, by the computer, that the wireless device is unknown;

monitoring, by the computer from the wireless signal detection device, signal strength information associated with the detected wireless signal of the unknown wireless device for a predetermined time interval;

comparing a pattern as a function of time of the received signal strength of the unknown wireless device to signal strength patterns stored in a database; and in response to determining that the pattern as a function of time of the received signal strength of the unknown wireless device matches, within a threshold value, a signal strength pattern that has been identified as suspicious, determine, by the computer, that the unknown wireless device is a suspicious wireless device within the physical area and activate a security alert.

8. The computer system of claim 7, wherein the program instructions cause the computer system to further perform the step of in response to determining, by the computer, that the wireless device ID associated with the wireless signal matches a wireless ID in the authorized wireless ID list, activate an access authorization signal.

9. The computer system of claim 7, wherein the program instructions cause the computer system to further perform the step of in response to determining that the pattern as a function of time of the received signal strength matches, within a threshold value, a signal strength pattern that has been identified as not suspicious, activate a non-suspicious access signal.

10. The computer system of claim 7, wherein the program instructions cause the computer system to further perform the steps of in response to determining that the pattern as a function of time of the received signal strength does not match, within a threshold value, a signal strength pattern that has been identified as suspicious nor a signal strength pattern that has been identified as not suspicious, activate an unknown access signal.

11. The computer system of claim 7, wherein the program instructions cause the computer system to further perform the step of including inputting the signal strength information associated with the detected wireless signal for a predetermined time into a cognitive learning computer, the cognitive learning computer updating signal strength patterns indicative of suspicious behavior stored in a scan data pattern database.

12. The computer system of claim 7, wherein the program instructions cause the computer system to further perform the step of tracking the position of the wireless device using at least to wireless signal detection devices.

13. A computer program product comprising:
program instructions on a computer-readable storage medium, where execution of the program instructions using a computer causes the computer to perform a method for monitoring a physical area for unauthorized access by a user of a wireless device, comprising:
storing in a database an authorized wireless device ID list and an unauthorized wireless device ID list;
scanning, by a wireless signal detection device coupled to a computer, for signals from a wireless device within a scanning range defining the physical area;
detecting, by the wireless signal detection device, a wireless signal from a wireless device within the scanning range;
determining, by the computer, a wireless device ID associated with the wireless device detected within the scanning range;
determining, by the computer, whether the wireless device is authorized, unauthorized or unknown,
in response to determining, by the computer, that the wireless device ID associated with the wireless signal matches a wireless ID in the unauthorized wireless ID list, determine, by the computer, that the wireless device is unauthorized and activate a security alert;
in response to determining, by the computer, that the wireless device ID associated with the wireless signal does not match a wireless ID in the authorized wireless ID list or the unauthorized wireless ID list, determine, by the computer, that the wireless device is unknown;
monitoring, by the computer from the wireless signal detection device, signal strength information associated with the detected wireless signal of the unknown wireless device for a predetermined time interval;
comparing a pattern as a function of time of the received signal strength of the unknown wireless device to signal strength patterns stored in a database; and
in response to determining that the pattern as a function of time of the received signal strength of the unknown wireless device matches, within a threshold value, a signal strength pattern that has been identified as suspicious, determine, by the computer, that the unknown wireless device is a suspicious wireless device within the physical area and activate a security alert.

14. The computer program product of claim 13, wherein the program instructions cause the computer to further perform the step of in response to determining, by the computer, that the wireless device ID associated with the wireless signal matches a wireless ID in the authorized wireless ID list, activate an access authorization signal.

15. The computer system of claim 13, wherein the program instructions cause the computer to further perform the step of in response to determining that the pattern as a function of time of the received signal strength matches, within a threshold value, a signal strength pattern that has been identified as not suspicious, activate a non-suspicious access signal.

16. The computer system of claim 13, wherein the program instructions cause the computer to further perform the step of in response to determining that the pattern as a function of time of the received signal strength does not match, within a threshold value, a signal strength pattern that has been identified as suspicious nor a signal strength pattern that has been identified as not suspicious, activate an unknown access signal.

17. The computer system of claim 13, wherein the program instructions cause the computer to further perform the step of inputting the signal strength information associated with the detected wireless signal for a predetermined time into a cognitive learning computer, the cognitive learning computer updating signal strength patterns indicative of suspicious behavior stored in a scan data pattern database.

18. The computer system of claim 13, wherein the program instructions cause the computer to further perform the step of tracking the position of the wireless device using at least to wireless signal detection devices.

* * * * *